Jan. 20, 1959  T. E. CROCKETT  2,869,578
VALVE DEVICE FOR TOILET FLUSH TANKS
Filed Dec. 4, 1956
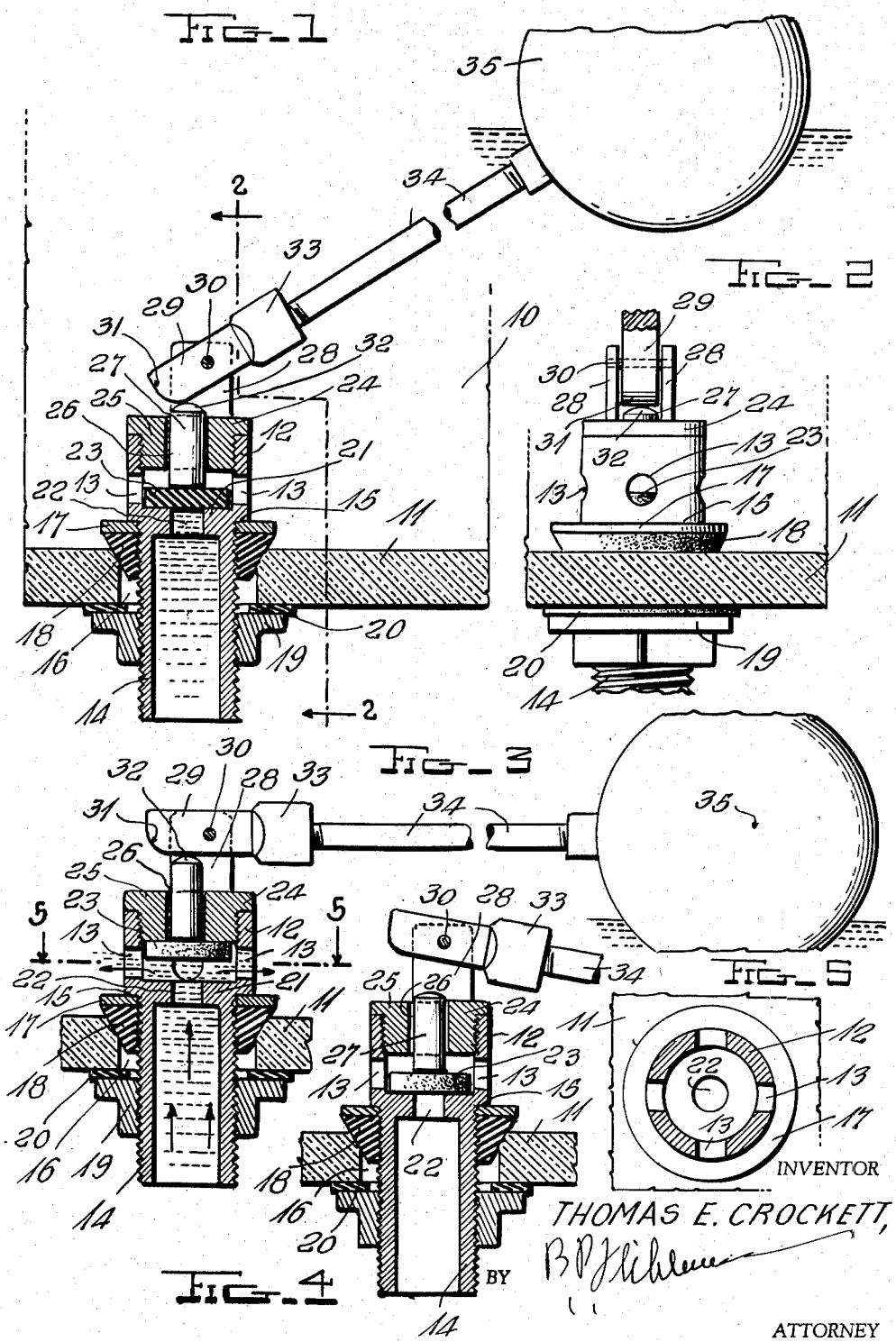
INVENTOR
THOMAS E. CROCKETT,
BY
ATTORNEY

2,869,578
VALVE DEVICE FOR TOILET FLUSH TANKS

Thomas E. Crockett, Corpus Christi, Tex.

Application December 4, 1956, Serial No. 626,261

1 Claim. (Cl. 137—444)

My invention relates to float operated valves for use in toilet flush tanks.

An important object of the invention is to provide a valve of the above-mentioned character which is extremely simple in construction, cheap to manufacture and easy to install.

A further object of the invention is to provide a valve element which is operated by the float, to control the entrance of the water into the tank, and which will automatically operate as a check valve to prevent back siphonage of the water into the supply line when a vacuum occurs in such line.

A further object of the invention is to provide a valve device having a part which carries the float lever and which part is readily removable so that a new valve element may be installed, when desired.

Other objects and advantages of the invention will be apparent during the course of the following description.

In the accompanying drawings forming a part of this application and in which like numerals are employed to designate like parts throughout the same, Figure 1 is a central vertical longitudinal section through the valve device, showing the float raised and the valve element seated.

Figure 2 is a vertical section taken on line 2—2 of Figure 1.

Figure 3 is a central vertical longitudinal section through the valve device, showing the float lowered and the valve element unseated.

Figure 4 is a similar view, showing the float lowered and the valve element seated, due to the presence of a vacuum in the supply pipe.

Figure 5 is a horizontal section taken on line 5—5 of Figure 3.

In the drawings, where for the purpose of illustration is shown a preferred embodiment of my invention, the numeral 10 designates a flush tank of conventional construction, having a bottom 11. This tank is equipped with the usual manually operated outlet valve, not shown. The tank and outlet valve may be of the type shown in my Patent 2,682,888.

The valve comprises a preferably cylindrical vertical casing 12, having outlet openings 13 in its side. The casing 12 is provided with a depending cylindrical tubular extension 14, forming a shoulder 15 with the casing. The tubular extension 14 has exterior screw-threads.

The tubular extension 14 is passed through an opening 16 formed in the bottom 11, and a washer 17 is provided, engaging beneath the shoulder 15, and engaging a tapered gasket 18, engaging in the opening 16 to form a water tight joint. A ring nut 19 has screw-threaded engagement with the tubular extension 14 and clamps packing 20 against the bottom 11. It is thus seen that the valve casing 12 is mounted upon the bottom 11 of the flush tank, but the invention is not restricted to this particular arrangement, as the valve casing may be elevated above the bottom 11. The supply line is connected with the tubular extension 14.

The valve casing 12, which is preferably cylindrical and vertical, as stated, is provided with a horizontal web 21, integral therewith having a vertical water discharge opening 22. The upper face of the web 21 constitutes a horizontal valve seat, arranged at an elevation slightly below the openings 13. The numeral 23 designates a flat disc valve element, which is cylindrical and arranged within the valve casing 12, to move freely therein, and positioned to engage the valve seat formed by the web 21 and thereby close the opening 22. When the valve element 23 is in the raised position, Figure 3, it uncovers opening 22 and partly uncovers openings 13 or might completely uncover the openings 13. The valve element 23 is preferably formed of fairly stiff rubber.

The numeral 24 designates a cap, having a depending reduced cylindrical portion 25, having screw-threaded engagement within the upper portion of the casing 12.

This cap has a central cylindrical opening 26, slidably receiving a plunger 27, which is adapted to engage the top of the disc valve element 23 at its center. The plunger 27 extends above the cap 24.

Preferably formed integral with the cap 24 and arranged above the same is a pair of spaced knuckles or flanges 28, extending above the plunger 27. Arranged between the knuckles 28 is a vertically swinging finger or lever 29, pivotally connected with the knuckles by a pin 30. This finger or lever has a rounded edge or cam face 31, to contact with the rounded end 32 of the plunger 27. Formed integral with the finger or lever 29 is a tubular coupling 33, having a rod or lever 34 rigidly mounted therein, and this rod carries at its free end a float 35.

The operation of the device is as follows:

When the tank 10 is flushed in the usual manner, the float 35 drops to the lowered position and the finger or lever 29 has its free end swung upwardly. This finger is therefore moved above the upper end of the plunger 27, which is then free to rise. The pressure of the water in the tubular extension 14 acts upon the disc valve element 23, unseating it and shifting it to the raised position, Figure 3, and the water then passes through openings 22 and 13 into the tank 10. As the tank fills, the float 35 rises and the finger or lever 29 is brought into engagement with the plunger 27 and the plunger seats the valve element 23, cutting off the supply of water to the tank, Figure 1. In the event of the presence of a vacuum in the pipe line and tubular extension 14, the valve element 23 will gravitate to the seated position, Figure 4, whereby the water within the tank cannot be siphoned back into the tubular extension 14. The valve element 23 is free to drop to the seated position, in the event of a vacuum in the tubular extension 14, since the valve element is separate from the plunger 27 and this plunger is separate from the finger or lever 29. Since the disc valve element is separate from the plunger 29, by removing the cap 24, which may be readily unscrewed from the valve casing 12, the plunger 27 being removable with the cap, the disc valve element may be readily removed and a new disc valve element substituted for the worn disc valve element. Furthermore, since the finger or lever 29 and rod 34 are carried by the cap 24 and not by the casing 12, these elements may be readily employed to rotate the cap when it is desired to remove and replace the same.

It is to be understood that the form of my invention herewith shown and described is to be taken as a preferred example of the same and that various changes in the shape, size and arrangement of parts may be resorted to, without departing from the spirit of my invention or the scope of the subjoined claim.

Having thus described my invention, I claim:

A float operated valve device for toilet flush tanks comprising, a valve casing which is vertically arranged and extends through an opening in the bottom of the flush tank and having its upper end projecting above the bottom, the lower end of the valve casing being adapted for connection with a water supply pipe, means to securely mount the valve casing upon said bottom, said valve casing having its top open, a substantially horizontal web mounted within the valve casing near and spaced from the top of the valve casing, said web having an opening formed therein, said web extending outwardly and laterally beyond said opening, said valve casing being provided in its side above the web with outlet openings, a disc valve freely movably mounted within the valve casing above the web and extending laterally and outwardly beyond the opening in the web and extending in close proximity to the side of the casing to be guided in its movement by said side, said disc valve having a vertical dimension less than the vertical dimension of said outlet openings, said disc valve being adapted to cover the opening in the web and to only partly cover the openings in the side of the casing, a cap having screw-threaded engagement with the top of the casing to be removed therefrom, said cap having a vertical opening formed therein, a movable vertical plunger removably mounted within the vertical opening of the cap and having its lower end arranged to contact with the top of the disc valve and free from connection therewith and having its upper end extending above the cap and provided with an inclined surface, spaced vertical knuckles arranged above the cap and rigidly secured thereto, a float operated lever device, a horizontal pin pivotally connecting the float operated lever device so that such device may swing vertically with relation to the cap, said device being rigidly connected with the cap when the device is moved horizontally to thereby turn the cap with relation to the casing, the free end of the lever device being arranged to contact with the upper inclined face of the upper end of the plunger and free from connection therewith.

References Cited in the file of this patent

UNITED STATES PATENTS

| | | |
|---|---|---|
| 505,272 | Kelly | Sept. 19, 1893 |
| 1,368,088 | Wright | Feb. 8, 1921 |
| 2,324,084 | Horner | July 13, 1943 |
| 2,329,337 | Criss et al. | Sept. 14, 1943 |